(12) United States Patent
Giacotto et al.

(10) Patent No.: US 9,103,669 B2
(45) Date of Patent: Aug. 11, 2015

(54) DISTANCE MEASURING DEVICE

(71) Applicant: Vectronix AG, Heerbrugg (CH)

(72) Inventors: Luca Giacotto, Au (CH); Riccardo Tinivella, Berneck (CH)

(73) Assignee: VECTRONIX AG, Heerbrugg (CH)

( * ) Notice: Subject to any disclaimer, the term of this patent is extended or adjusted under 35 U.S.C. 154(b) by 42 days.

(21) Appl. No.: 13/788,986

(22) Filed: Mar. 7, 2013

(65) Prior Publication Data

US 2013/0235366 A1  Sep. 12, 2013

(30) Foreign Application Priority Data

Mar. 7, 2012 (EP) ..................................... 12158382

(51) Int. Cl.
*G01C 3/08* (2006.01)
*G01S 17/10* (2006.01)
*G01S 7/484* (2006.01)
*G01S 7/486* (2006.01)

(52) U.S. Cl.
CPC . *G01C 3/08* (2013.01); *G01S 7/484* (2013.01); *G01S 7/4865* (2013.01); *G01S 17/10* (2013.01)

(58) Field of Classification Search
CPC ........... G01C 3/08; G01S 17/10; G01S 7/497; G01S 17/89
USPC ....................................................... 356/5.01
See application file for complete search history.

(56) References Cited

U.S. PATENT DOCUMENTS

| | | | |
|---|---|---|---|
| 3,628,048 A | 12/1971 | Lee et al. | |
| 3,898,588 A | 8/1975 | Skagerlund | |
| 4,669,850 A * | 6/1987 | Uchiyama et al. | 396/61 |
| 5,303,248 A * | 4/1994 | Gibbs | 372/25 |
| 6,133,989 A * | 10/2000 | Stettner et al. | 356/4.01 |
| 6,310,682 B1 | 10/2001 | Gavish et al. | |
| 7,945,408 B2 * | 5/2011 | Dimsdale et al. | 702/79 |
| 8,103,059 B2 * | 1/2012 | Lin et al. | 382/106 |
| 2002/0131034 A1 | 9/2002 | Chien et al. | |
| 2007/0024841 A1 | 2/2007 | Kloza | |
| 2009/0059201 A1 | 3/2009 | Willner et al. | |
| 2009/0185159 A1 * | 7/2009 | Rohner et al. | 356/5.01 |
| 2009/0273770 A1 | 11/2009 | Bauhahn et al. | |

FOREIGN PATENT DOCUMENTS

| | | |
|---|---|---|
| DE | 2331084 | 1/1974 |
| DE | 19943127 | 3/2001 |
| WO | 9722179 | 6/1997 |
| WO | 2006063740 | 6/2006 |
| WO | 2007022927 | 3/2007 |
| WO | 2009156580 | 12/2009 |

OTHER PUBLICATIONS

Donati, Silvano, "Electro-Optical Instrumentation: Sensing and Measuring with Lasers", p. 51-55, chapter 3.2.3.

* cited by examiner

*Primary Examiner* — Luke Ratcliffe
*Assistant Examiner* — Vicente Rodriguez
(74) *Attorney, Agent, or Firm* — Muncy, Geissler, Olds & Lowe, P.C.

(57) ABSTRACT

An optoelectronic distance measuring device is disclosed. The device has a transmitting unit with a driver stage for emitting optical pulses, a receiving unit for receiving a portion of the optical pulses, said portion being reflected from a target object, and converting it into an electrical reception signal, via a photosensitive electrical component. It also has an analog-digital converter for digitizing the reception signal, and an electronic evaluation unit to ascertain a distance from the target object on the basis of a signal propagation time using the digitized reception signal. The driver stage can be designed so that at least two pulse durations of different length for the optical pulses can be set.

19 Claims, 6 Drawing Sheets

DISTANCE MEASURING DEVICE

This application claims priority to European Patent Application No. 12158382.7, which was filed in Europe on Mar. 7, 2012, and which is herein incorporated by reference in its entirety.

BACKGROUND OF THE INVENTION

1. Field of the Invention

The invention relates to a distance measuring device according to the preamble of Claim 1 and to a distance measuring method according to the preamble of Claim 9.

2. Description of the Background Art

In electro-optical distance measuring devices (EDM), an optical signal is emitted from the apparatus in the direction of the target object whose distance it is necessary to determine, for example as optical radiation in the form of laser light. If visible light is used in this case, then the point aimed at for measurement on the target object can be visually discerned. By contrast, if non-visible wavelengths, e.g. in the infrared range, are used or if the target object is further away, then aiming at the point to be measured can be carried out by means of an optical device, for example by means of a crosshair in an observation device.

The surface of the target object reflects at least part of the optical signal, usually in the form of a diffuse reflection. The reflected optical radiation is converted into an electrical reception signal by a photosensitive detector element in the apparatus. With knowledge of the propagation velocity of the optical signal and with the aid of the propagation time determined between emission and reception of the signal (that is to say that propagation time which is required by the light for covering the distance from the apparatus to the target object and back), it is possible to determine the distance between apparatus and target object. In this case, optical components for beam shaping, deflection, filtering, etc.—such as, for instance, lenses, wavelength filters, mirrors, etc.—are usually situated in the optical transmission and/or reception path. In this case, the emission and reception can be effected coaxially or by means of two adjacent optical units. Distance measuring devices of this type can be designed as independent apparatuses, but can also be integrated into other apparatuses, for example into surveying apparatuses such as theodolites or tachymeters, or into observation apparatuses such as telescopes, monoculars, binoculars, night vision apparatuses, etc.

In order to compensate for influences which might corrupt the measurement results (for example temperature influences, component tolerances, drifting of electronic components, etc.), part of the emitted optical signal can be guided as a reference signal via a reference path of known length from the light source to a light-sensitive receiving element. In this case, the reference path can be fixedly incorporated in the apparatus or be designed for example as an optical deflection element that can be pivoted in or plugged on. The reception signal resulting from said reference signal can be received by the photosensitive element which is also used for measurement or by a further photosensitive element provided especially for the reference signal. The resulting electrical reference signal can be used for referencing and/or calibrating the measured values determined.

In order to obtain a correspondingly high accuracy of the distance measurement, on account of the high propagation velocity of optical radiation, the requirements made of the temporal resolution capability in electro-optical distance measuring devices (EDM) are extremely high. By way of example, for a distance resolution of 1 m, a time resolution having an accuracy of approximately 6.6 nanoseconds is required.

The measurement requires sufficiently high signal intensities for the returning reception signal that are able to be detected by the receiver. The signal power which can be emitted for the transmission signal from the optoelectronic EDM under consideration here is limited by physical and regulatory limits, however. In many cases, pulsed operation is therefore used. The emitted optical signal thus has its intensity amplitude modulated in a pulse-like manner. Temporally short pulses having a high peak power are emitted, followed by pauses in which no emission of light takes place. Hence, the reflected portion of the pulses has sufficiently high intensity to allow said pulses to be evaluated from the background disturbances and noise, particularly also when background light (sunlight, artificial lighting, etc.) is present. The number of pulses per packet can be varied, depending on the evaluation concept and the measurement situation, from single pulses through to a quasi-continuous pulse train.

In order to determine the propagation time of the signal, firstly the so-called time-of-flight (TOF) method is known, which determines the time between the emission and reception of a light pulse, the time measurement being effected with the aid of the edge, the peak value or some other characteristic of the pulse shape. In this case, pulse shape should be understood to mean a temporal light intensity profile of the reception signal, specifically of the received light pulse—detected by the photosensitive element. The point in time of transmission can be determined either with the aid of an electrical pulse for initiating the emission, with the aid of the actuating signal applied to the transmitter, or with the aid of a reference signal mentioned above.

Secondly, the so-called phase measuring principle is known, which determines the signal propagation time by comparison of the phase angle of the amplitude modulation of the transmitted and received signals. In this case, however, the measurement result in the case of one transmission frequency has ambiguities in units of the transmission frequency period duration, thus necessitating further measures for resolving these ambiguities. By way of example, WO 2006/063740 discloses measurement with a plurality of signal frequencies which result in different unambiguity ranges, as a result of which incorrect solutions can be precluded. WO 2007/022927 is also concerned with unambiguities in phase measurement.

When the principles of distance measuring methods are considered mathematically, it is possible to see a dependency for the attainable distance measuring accuracy on the emitted light pulses. As explained in the book "Electro-Optical Instrumentation—Sensing and Measuring with Lasers" by Silvano Donati, in chapter 3.2.3, for example, it is possible to see that the measuring accuracy is dependent on the reception signal energy (that is to say on the number of photons received). The embodiment of distance determination using a threshold value for the reception signal edge which is described in this section of the book can be regarded as exemplary in this case and merely as a good example. The underlying principles and the results thereof can similarly also be applied to other evaluation methods for ascertaining distance by determining the propagation time of light pulses.

Specifically, equation 3.16, $$\sigma_1 = \tau \cdot (\text{factor})$$

shows that the period of the pulse $\tau$ has an influence during determination of the attainable measurement error $\sigma_t$, particularly an essentially linear influence, scaled using a factor which combines a wide variety of other influencing variables.

This fundamental result also continues to be valid when the algorithm used for evaluating the distance is varied, specifically since the physical principles of measurement remain the same. The result is also largely independent of the signal shape received.

Since the measurement inaccuracies therefore improve linearly in a first approximation as the pulses used become shorter in time, a higher level of measurement accuracy can be achieved with shorter pulses.

The intensity of the received portion, reflected from the target object, of the emitted light is dependent on various factors and can therefore also vary greatly. In this case, an influencing variable that can be mentioned is the distance from the target object, with which the expansion of the emitted beam of measurement light increases, and also the signal attenuation as a result of atmospheric disturbances such as mist, fog, heat haze or dust increases on account of the longer path. In distance measuring devices, large working ranges are often required in this case, for example from the dm range to the km range. In observation apparatuses having distance measuring devices (for example night vision apparatuses, telescopic sights, telescopes, binoculars, etc.), there are often required ranges of from a few meters to many kilometers, for example from 5 m to 20 km or 30 km, and this is with a measurement accuracy of a few meters or even less, for example of from ±1 m to ±5 m or less.

A significant factor in this case is the signal-to-noise ratio (SNR) of the information used for determining the distance. The SNR attained is, inter alia, also one of the main criteria for the maximum measurement distance that can be attained.

If the received signal is too weak, then it can no longer be identified unambiguously from the background noise or the ambient light. On account of the poor signal-to-noise ratio, only an inaccurate or in the worst case no distance measurement at all is possible. In order to be able to perform a measurement, the SNR needs to exceed a certain minimum level at which the signal can be discerned from noise and hence it is actually possible to perform a measurement. Particularly by virtue of statistical methods, averaging operations, etc., this is entirely possible even with a low effective SNR for a single received pulse. In the case of a repeated train of short pulses and summation or averaging of the resultant measurement signals, a higher SNR can be attained. The statistical averaging performed in this case can prompt an improvement in the SNR by averaging out nondeterministic error influences, such as noise. Numerical averaging of a plurality of measurements following the A/D conversion can also prompt the significant bits of the digital reception signal representation to be expanded. By way of example, correct-phase accumulation of a plurality of reception pulses may allow measurement even at SNR values for the single pulses below 1. With N reception pulses, this results in an improvement in the signal-to-noise ratio (SNR) by approximately a factor of $\sqrt{N}$, this effect not being able to be extended to any number N, but rather the improvement becoming saturated from a certain number of pulses onwards.

An SNR above a minimum threshold is a basic requirement to be able to perform a measurement in the first place. A further increase beyond this minimum threshold allows greater measurement accuracy, greater reliability of the measurement or shorter measuring periods (for example because fewer signals need to be accumulated in order to obtain an evaluatable signal). However, the aforementioned improvements also decline from a certain SNR level onward and then have only a marginal effect on the measurement result, for example because other limiting effects prevail.

In this case, the noise term N is formed primarily by the signal transmission path, that is to say by the measurement distance over which the light travels, by external interfering influences, such as ambient light and (usually to a substantial degree) by the noise in the electronic receiving circuit. In this case, N is also dependent on the ambient conditions such as temperature, etc., which need to be accepted as pre-existing. Particularly in apparatuses having a distance measuring device for field use, temperature ranges of from −20 to +60° C., for example, or greater are often required. Although the receiving circuit is designed to have as little noise as possible, this cannot be avoided totally.

The signal term S also has limits set. Besides the reflectivity of the target for the measurement radiation, which reflectivity cannot be influenced without using specially prepared targets, the received intensity of the reflected signal also decreases as the measurement distance increases, for example. Although it is possible to subsequently raise the signal level through amplification, this also always amplifies the noise (which occurs before and in the amplifier). The amplifier used for this is also an additional noise source in the system.

An obvious approach to increasing the signal strength of the reception signal is to increase the signal strength of the transmission signal. If it is assumed that the attenuation of the signal path with respect to the signal strength is linear, this prompts a linear increase in the SNR. Hence, by way of example, doubling the transmission intensity could also (at least approximately) achieve doubling of the SNR of the reception signal. The maximum possible transmission intensity has limits set, however, specifically by physical limits, for example the light source used, the actuating circuit, the available transmission power or supply power, thermal limits, etc., specifically with regard to constraints such as small physical size, battery operation, component costs, etc., which pre-exist specifically in the case of a mobile distance measuring device.

If the received optical signal has too great an amplitude, on the other hand, then this can result in saturation in the receiver, e.g. for the receiving element, an amplifier stage or an A/D converter. Such saturation makes accurate distance measurement difficult or impossible. The signal dynamic range of the receiving circuit is thus limited on the basis of hardware, which also limits the possible range of the S term. By setting the pulse amplitudes, it is possible to adopt different target object reflectivities and signal attenuations along the measurement path, for example.

The document WO 97/22179 describes a circuit arrangement for a pulse output stage which can be used as a driver stage for feeding a light source and for emitting light pulses. This circuit can be used to vary the amplitude of the emitted pulses and hence the energy emitted per pulse. The duration of the pulses produced is fixedly prescribed by the circuit design, however. DE 23 31 084, DE 199 43 127 and U.S. Pat. No. 3,628,048 also show similar circuit concepts. The durations of the pulses in this case change at most as a by-product of the amplitude change, for example as a result of changing signal edge gradients or signal edge levels.

The range of variation of the transmission pulse amplitude has limits set even with such a pulse output stage, however. Firstly, the saturation of the receiver, explained previously, needs to be avoided. If, by way of example, a constant radiation portion is coupled from the transmitter directly onto the receiver as a reference signal via a reference path, the admissible amplitude dynamics of the transmitter need to match those of the reference receiver. The radiation source of the actuating circuit therefor may also be a limiting factor with a maximum possible pulse amplitude value.

A further known starting point for improving the SNR is to filter out the undesirable noise component from the measurement signal. Specifically, this involves matching the bandwidth (BW) of the received signal to that of the useful signal, that is to say filtering out high frequency or low frequency noise and also other interference signals using digital and/or analogue filters, for example. In this case, the SNR can be improved by a factor of √BW, for example. In this case too, practical implementability has limits set, since steep filters of high quality and high linearity in amplitude and phase can be implemented only with difficulty in practice. By way of example, it is necessary to avoid aliasing effects during digitization by adhering to the Nyquist criterion sufficiently well. Specifically analogue filters having appropriate characteristic values are a challenge in terms of circuitry. On the other hand, alternative digital filtering requires the use of correspondingly higher sampling rates and is therefore likewise complex and costly in terms of circuitry.

In this case, excessive limiting of the bandwidth has a negative effect on measurement accuracy, since trimming the high frequency components also entails a loss of signal information. This is also consistent with the assessment explained further above that higher measurement accuracy can be achieved with short—and hence more wideband—pulses. The bandwidth of the receiver should therefore be attuned (at least approximately) to the bandwidth of the transmitted pulse signal.

The known solutions from the prior art in their known form are therefore a compromised solution as regards the signals used for distance measurement. Particularly in the case of distance measuring devices in observation apparatuses, which are not intended for highly accurate geodetic land surveying, for example with measurement accuracies approximately in a range of one meter and with measurement ranges of up to 5, 10, 20 or 30 km or more and which generally require no special target marks for measurement, the apparatus design in the prior art designs and stipulates the signal used such that it is possible to measure distance over the entire specified measurement range (or the range specified on the basis of the possibilities of the signal used).

It is an object of the present invention to improve an optoelectronic distance measuring device.

In this case, it is also an object to expand the scope of distance measurement for an EDM, that is to say that distance range in which distance measurement is possible, specifically without losing measurement accuracy at short range.

In particular, it is an object to improve the relative distance measuring accuracy for the distance over the measurement range, specifically in each case at the upper and lower ends of the capturable measurement range.

It is a further object of the present invention to improve and simplify the distance measuring device by simplifying matching parameters of the distance measurement to the circumstances of the respective measurement task.

It is also a specific object to provide user-selectable measurement modes which can be used to meet the respective requirements of a measurement task. In this case, the user can be provided with the freedom of choice between greater maximum distance range—but with a less accurate distance measurement value, or a shorter maximum distance range—but with more precise measurement of the distance value.

As a specific task, the aim is to provide a transmitting unit for a distance measuring device, particularly a semiconductor laser driver stage as a pulse output stage, which can be used to influence the emitted pulses not only in terms of their amplitude value but also in terms of their pulse duration.

According to the invention, short pulses, which are evaluated using a large bandwidth in the receiving circuit used, are applied for correspondingly high signal strengths (that is to say specifically for short distances, highly reflective targets and/or good visibility). These short pulses allow—when evaluated at high frequency—accurate distance measurement. In this context, a large bandwidth can be understood to mean particularly a receiving circuit bandwidth that is as large as possible on the basis of hardware and that is prescribed as a design criterion with the circuit layout.

If the received signal intensity in comparison with noise is insufficient to perform a measurement successfully (specifically in the required time), the invention involves the emission of pulses of relatively long pulse duration which can also be evaluated with a lower bandwidth as appropriate. This allows more narrowband filtering and better noise rejection and hence an improvement in the SNR.

Since the hardware receiving circuit is designed for the higher bandwidth of the short pulses anyway, it is particularly possible to apply digital filtering in software or hardware in this case. Although the alternative of bandwidth matching for an analogue filter is likewise possible, switching analogue filter coefficients can be complex, can increase the complexity and component outlay for the circuit and can generally reduce circuit performance.

SUMMARY OF THE INVENTION

In summary, the invention allows temporally short pulses to be used to attain greater measurement accuracy, these shorter pulses also requiring a correspondingly high bandwidth in the receiver. However, the high bandwidth also prompts an increase in the noise term or worsening of the SNR. This poorer SNR reduces the maximum possible measurement distance, since the received signal strength decreases as the target distance increases. Therefore, the invention uses temporally long pulses to increase the maximum possible measurement distance, specifically because they can be evaluated with a lower bandwidth and hence a reduced noise term or improved SNR.

An electro-optical distance measuring device according to the invention, particularly a laser distance measuring device, also called an EDM (electronic distance measuring device) or LRF (laser range finder), for solving said problems according to the invention, is constructed with

- a transmitting unit having a driver stage for a light source, particularly a semiconductor light source, for emitting optical pulses as pulsed-mode-intensity-modulated optical radiation,
- a receiving unit for receiving a portion of the optical radiation, said portion being reflected from a target object, and converting it into an electrical reception signal, by means of a photosensitive electrical component, particularly a photodiode, specifically an ADP or PIN photodiode,
- an analogue-digital converter for digitizing the reception signal, and
- an electronic evaluation unit which is designed in such a way that a distance from the target object can be ascertained on the basis of a signal propagation time using the digitized reception signal.

According to the invention, the driver stage is designed in such a way that the optical pulses can be emitted with a variably adjustable pulse duration.

In the case of the distance measuring device, the electronic evaluation unit may also be designed in such a way that when ascertaining the distance, using a filter, a bandwidth of the reception signal is matched to the pulse duration that has been set, particularly that in the case of a relatively long pulse duration the bandwidth is reduced, specifically the upper cutoff frequency of a low-pass-filter characteristic of the filter is lowered. In particular, the evaluation unit is designed to have a digital filter for matching the bandwidth of the digitized reception signal.

The driver stage of the distance measuring device may be designed in such a way that pulses of the optical radiation can be emitted with a variably adjustable pulse amplitude value. In this case, the values of the pulse amplitude and of the pulse duration, which are prescribed by a control unit, may each be configurable independently of one another.

The distance measuring device can provide at least
- a first mode of operation with a set first, short pulse duration and
- a second mode of operation with a set second, long pulse duration, particularly wherein the first mode of operation has a higher distance measuring accuracy and a shorter maximum ascertainable distance than the second mode of operation with a relatively low distance measuring accuracy and a relatively longer maximum ascertainable distance. In this case, one of the modes of operation may be prescribable by an external user.

The control unit may be designed in such a way that the set, configured or parameterized pulse duration is chosen on the basis of an at least coarsely ascertained or estimated distance. In particular, the pulse duration can be set to be longer for long distances than for short distances. When a distance threshold is exceeded by the ascertained distance, the pulse duration can then automatically be set to be longer than when the ascertained distance is below the distance threshold.

By way of example, the driver stage of the distance measuring device may be a pulse output stage which is designed in such a way that a pulse duration for output pulses which actuate the light source can be set, with particularly a pulse amplitude for output pulses also being able to be set.

The driver stage of the distance measuring device may have a connectable capacitor, for example, connection of which can be used to set, particularly extend, the pulse duration of the emittable light pulses.

According to the invention, by way of example, an observation apparatus may be equipped with a distance measuring device as described previously, in which the observation direction of said observation apparatus runs at least approximately parallel to a measuring direction of the distance measuring device. In this case, a "high distance accuracy" mode and a "long measurement distance" mode for the distance measuring device can be selected on the observation apparatus.

The invention likewise relates to a distance measuring method comprising
- emission of pulsed-mode-amplitude-modulated optical radiation, particularly laser light,
- reception of a portion of the optical radiation, said portion being reflected from a target object, by means of a photosensitive electrical component which converts the received optical radiation into an electrical reception signal,
- digitization of the reception signal by means of an analogue-digital converter, and
- ascertainment of a distance from the distance measuring device to the target object on the basis of a signal propagation time by means of evaluation of the digitized reception signal by means of an electronic evaluation unit.

In this case, the emission takes place when a pulse duration is set for the emitted optical radiation.

By configurably filtering the reception signal when ascertaining the distance, it is possible to match a bandwidth of the reception signal to the set pulse duration, and in this case the bandwidth can be reduced for longer pulse durations. The filtering can be effected as a digital filter for the digitized reception signal. Besides the pulse duration, it may also be possible to set a pulse amplitude, the duration and amplitude each being able to be set separately from one another.

The pulse duration can be set on the basis of the distance, in particular it is possible to set a longer pulse duration for a distant target object (at a relatively long distance) than for a close target object (at a relatively short distance). Specifically, the set pulse duration can automatically be matched to the ascertained distance, in particular it is possible to extend the pulse duration as distance increases, with specifically the pulse amplitude being kept constant. Alternatively, it is also possible to extend the pulse duration of the emitted optical radiation when the signal-to-noise ratio (SNR) is below a prescribed minimum threshold.

The distance measuring method according to the invention can be performed such that a selection is made between
- a first mode "accurate measurement" with emission of light pulses with a shorter duration than in
- a second mode "long measurement" with emission of light pulses with a longer duration than in the first mode.

In other words, the invention relates to a method for matching the distance resolution capability or the distance measurement range of an optoelectronic distance measuring device comprising matching of a pulse duration of an emitted optical transmission signal from the distance measuring device on the basis of an ascertained (or ascertainable) distance. This can be effected particularly by extending the pulse duration for relatively long distances by means of an evaluation unit and matching the bandwidth of a reception signal, used for ascertaining the distance, to the pulse duration. In this case, the extension can be performed manually by the user or automatically by the evaluation unit. By way of example, the pulse duration of the emitted light can also be extended dynamically and/or on the basis of distance. A distance measuring method according to the invention may also have an automatic mode which performs variable adjustment of the pulse duration using characteristics of the received signal automatically. By way of example, such characteristics may be the determinability of reception pulses in a reception signal, the SNR thereof, etc. In another embodiment, it is also possible to implement an automatic mode in which the pulse duration is set variably on the basis of a current setting for focussing and/or a zoom factor of the targeting device.

The invention also relates to a computer program product having program code, which is stored on a machine-readable storage medium, or to a computer data signal, embodied by an electromagnetic wave, for carrying out the above method. In this case, the program code can vary the maximum measurement distance of an EDM by setting a pulse duration for a driver stage in the EDM. To this end, the program code can be executed in an evaluation unit of the electro-optical distance measuring device.

The method according to the invention and the apparatus according to the invention are described in more detail below purely by way of example using specific exemplary embodiments which are shown schematically in the drawings, and further advantages of the invention are also discussed. Specifically, in the drawings:

The illustrations in the figures serve merely for illustration and should not be considered as being to scale. The illustrated circuit diagrams each show the basic circuit structure, which can be added to or modified by a person skilled in the art in accordance with general principles of electronics development.

DETAILED DESCRIPTION

Figure 1:
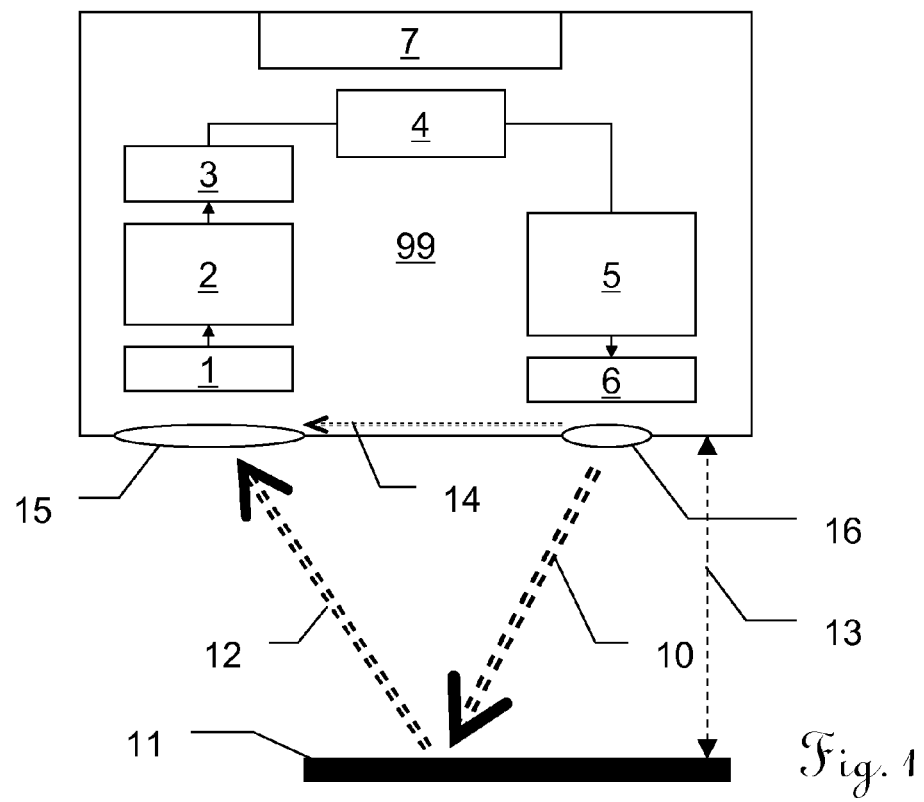
FIG. 1 shows a first embodiment of an inventive distance measuring device in the form of a block diagram.

FIG. 1 shows an embodiment of an inventive optoelectronic distance measuring device 99 in the form of a block diagram. By way of example, this may be a battery operated distance measuring device which is fitted in an observation apparatus and which can be used for sighting and determining target coordinates for a target object 11. Alternatively, the principle according to the invention can be applied to other distance measuring devices, for example in surveying apparatuses.

The right-hand half of the distance measuring device block 99 shows the transmitting unit and the left-hand half shows the receiving unit. The separation between the two units which is described here can be seen primarily on a functional basis in this case and may (but does not have to) be designed in the form of two physically separate units. It is possible to produce embodiments in which both units are accommodated on a shared printed circuit board, and also embodiments in which the components of the distance measurement are split over a plurality of printed circuit boards, which are also arranged so as to be physically separate.

The target object 11 for which it is necessary to determine the distance 13 reflects at least some of the electromagnetic radiation 10 emitted by the transmitting unit to the receiving unit as reception radiation 12. In this case, some of the emitted radiation can also be routed to the receiving unit as a reference beam 14 via a reference path of known length. The reference beam 14 and the measurement beam 10 may each be provided with a dedicated receiving unit or a shared receiving unit. When a separate reference receiver is used, the receiving unit or parts thereof accordingly need to be of doubled design. It is also possible for the beam guiding to be changed over between reference beam 14 and measurement beam 10, for example by means of a reference deflection device that is within the apparatus or can be fitted externally. Alternatively, the principle according to the invention can be applied to a distance measuring device without an optical reference path.

By virtue of the target object 11 shown disproportionally near in FIG. 1 for reasons of space, the transmission beam 10 and the reception beam are illustrated at an unusually steep angle with respect to one another. In practical embodiments, the transmission and reception beam paths (that is to say the optical axes thereof) are oriented such that they can be regarded as approximately parallel to one another or intersect at a prescribed distance. Embodiments having specific optical units that effect distortion in an angle-dependent manner at the receiver are also known, in order to be able to cover a wide distance range, specifically including short distances. Embodiments having coaxial optical axes of the transmission and reception beam paths are also known, this being able to be achieved by virtue of the transmission beam 10 being reflected into the region of the centre of the receiving optical unit 15, for example.

In the distance measuring device 99, a block diagram of an exemplary internal construction of an embodiment of the transmitting and receiving unit is in each case illustrated, which will now be discussed in detail. The illustration serves merely to explain an exemplary internal apparatus construction, which can also be varied within the context of practical embodiments of the principle according to the invention.

The embodiment of the transmitting unit shown by way of example has a controller processor 4 and a driver stage 5 for the light-emitting component 6, which converts the electrical signals of the driver stage 5 into electromagnetic radiation 10, 14. By way of example, semiconductor light sources, e.g. semiconductor lasers, semiconductor-pumped lasers or light-emitting diodes (LED), or other light sources can be used as light emitter 6. The emitted light is collimated by an optical unit 16 to form a directed beam 10 having low divergence. In this case, the driver stage 5 is adapted to the emission characteristics of the light source 6 in order to produce the intensity-modulated optical transmission radiation 10. In this case, the intensity of the emitted light signals 10 can be prescribed by the control unit 4, for example in a plurality of discrete steps or else continuously. Such variation of the optical output power can be used in order, in accordance with the proportion of a light 12 returning from the target object 11 to the receiver 1, to obtain a reception signal in an intensity range that can be evaluated by the receiver unit, for example. The advantageously evaluatable intensity range can, by way of example, be defined as that range which is above a lower detectability limit for the receiving unit—but below an upper saturation for the receiving unit.

If the reception signal is, by way of example, very weak relative to the signal noise or if the reflected portion of the emitted pulse is not detectable at all in the reception signal, then the intensity of the transmission signal can be increased (e.g. in steps or continuously) until it is possible to determine the distance. Conversely, in the case where the receiver is overdriven, the emission power can be decreased until saturation of the input circuit no longer occurs. Since the alteration of the emission power may also be accompanied by other, parasitic effects, the output power is often varied between discrete steps for which at least partial compensation for the parasitic effects can in each case be performed using calibration parameters.

Specifically on account of the temperature dependence of the emission power of laser diodes, the driver stage may contain a control loop for complying with the desired optical transmission power, which is monitored by means of a monitor photodiode, for example. The laser driver stage 5 or the actuation thereof may also be designed to comply with safety conditions, for example with the eye safety guidelines.

In the embodiment shown, the control processor 4 can be ascribed both to the transmitting unit and to the receiving unit and controls the sequences for determining the distance. In other embodiments, it is also possible to use a plurality of control processors 4 which each perform specific partial tasks. By way of example, the control processor 4 may be an appropriately programmed digital computer, such as a microprocessor or DSP. Alternatively, the control processor 4 or parts thereof may also be embodied as an FPGA, ASIC or with at least partly hardwired logic.

The block 7 is the power supply for the distance measuring device, said power supply containing not only supply filters but possibly also a voltage stabilization or control unit or a boost or buck converter. Power can be supplied by means of batteries, storage batteries or other apparatus-internal or apparatus-external electrical energy sources.

The receiving unit converts received electromagnetic radiation 12 into an electrical signal by means of the receiving element 1. Said electrical signal can also be conditioned as appropriate in the block 2 for further processing, for example by impedance conversion, filtering, amplification, band limiting, heterodyne or homodyne mixing, etc. There may thus be an input filter, a (transimpedance) amplifier, a mixing stage, a sample&hold element, etc., or else a combination of these present, for example. As a receiving element, the receiver 1 of the optical radiation 12 can use a photodiode, for example a PIN or avalanche photodiode (APD) having a corresponding bias voltage. By varying the bias voltage of the APD, it is possible to set the transmission ratio thereof from the optical signal toward the electrical signal. In the case of APDs, however, not only the gain but also the noise increases with the bias voltage.

The conditioned reception signal is digitized—that is to say time and value quantified—by an analogue-digital converter 3 and is supplied to a digital computation unit 4 (a microprocessor, DSP, FPGA, ASIC, etc.) for further processing and for determining the distance. If appropriate, the EDM system may be equipped with an additional external processor, microcontroller or DSP which can specifically undertake evaluation or interfacing tasks, for example the provision of an operator control interface or of a communication interface.

By increasing the amplitude or the peak value of the emitted signal pulses, it is likewise possible to improve the signal-to-noise ratio of the reception signal. Such an increase has physical limits set, however, for example in the form of a maximum possible peak power for the actuating circuit or for the light emitter. In order to obtain an apparatus design that is optimized in terms of cost, the components used are usually operated in the upper range of their admissible characteristic values anyway, which means that the further increase in the output power is infeasible in many cases or would entail higher costs. Higher actuating pulses can also result in increased electromagnetic interference emission and/or heat problems.

Extending the pulse duration (also called pulse length) in accordance with the invention can likewise be used to improve the SNR without having to design the transmitting stage for higher peak voltages at the same time. Although the temporally longer pulse does not directly increase the value of the received signal, it is possible to evaluate a longer pulse with a smaller bandwidth. This lower bandwidth brings about better rejection of the noise (the noise term is approximately proportional to the square root of the bandwidth), however, which can improve the SNR—from the other side, as it were.

Although the steeper signal edges and the higher bandwidth of short pulses allow more accurate distance determination, the noise bandwidth which is captured at the same time is likewise higher. The component costs, the evaluation complexity, the power consumption, etc., also rise with higher bandwidths and correspondingly higher measurement frequencies for the evaluation circuits, which is unacceptable for many applications, particularly mobile applications.

Up to certain distances (or target reflectivities), an increase in the pulse amplitude may therefore be the means of choice, but cannot be scaled arbitrarily toward very large ranges in practice. It may also have other associated disadvantages, such as higher power consumption or a longer measurement time, since a sufficiently large SNR for measurement can be achieved only by overlaying a multiplicity of reception signals. In some applications, a fast, energy-saving measurement, or a longer measurement range, can be preferred, even if this reduces the measurement accuracy. The concept according to the invention also allows changeover between two or more modes of operation which can respectively be used to select the maximum range (or conversely the attainable measurement accuracy) on the prepared apparatus (even during measurement).

According to the invention, the EDM is improved by making it possible to capture a long range and to render it accessible to measurement. The measurable range scope of the EDM is therefore improved, and distance finding is made possible for a wide distance scope for target objects. The invention achieves this by extending the duration of the emitted light pulses for longer measurement distances, which can be implemented by extending the actuating pulses of the light source, for example. For shorter measurement distances, which do not require such a long range, the invention generates light pulses or actuating pulses of relatively short duration, as a result of which it is possible to achieve greater accuracy for the distance value determined by the EDM than in the case of the pulses having long pulse durations.

Hence, it is possible to cover a larger range scope in comparison with known apparatuses without thereby having to accept lower measurement accuracy even for measurement at close range. By way of example, this can be accomplished by virtue of the mode of operation being changed in the transmitting unit, depending on the embodiment manually by the user or automatically by a control unit of the EDM, for example on the basis of characteristics of the reception signals.

When choosing the smallest pulse width in a distance measuring device, it is usually necessary to take account of the bandwidth of the hardware of the receiver circuit, since this limits the minimum pulse duration that can usefully be processed within the context of distance measurement.

Figure 2:
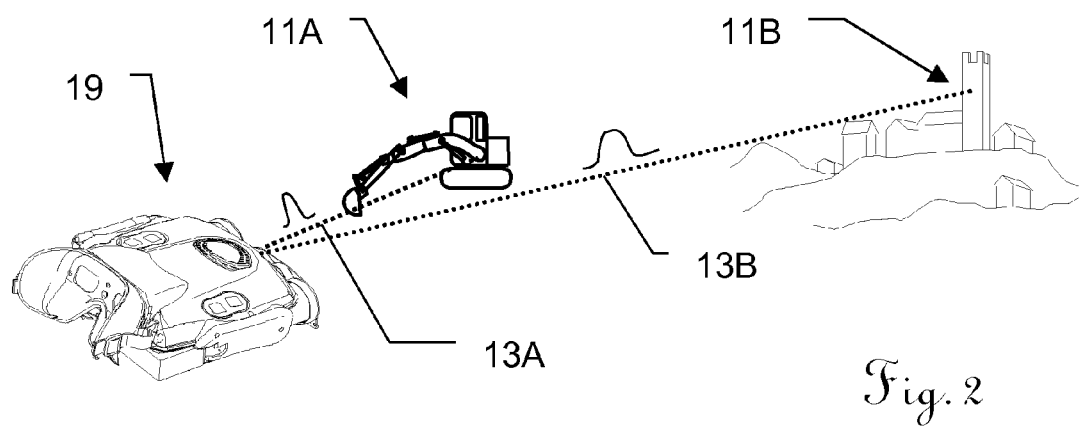
FIG. 2 shows an exemplary illustration of an application of an inventive EDM in an observation apparatus.

FIG. 2 shows an exemplary use of an inventive distance measuring device 99 in an observation apparatus 19, which can be used for sighting a target object 11 and determining the distance 13 thereof from the observer. In this case, the observation apparatus has an observation direction which at least approximately matches the measuring direction of the distance measurement, as a result of which the distance measuring device 99 can be used to ascertain a distance from an observed target point 11. By way of example, it is also possible to use what is known as a goniometer, that is to say to use inclination sensors, for example, in the observation apparatus (or in a stand supporting the observation apparatus) to ascertain an inclination of the measuring direction with respect to the horizontal, as a result of which it is possible to ascertain a horizontal projection for the distance 13 determined by the EDM, for example. It is also possible, for example using a compass or a vertical angle measurement in the observation apparatus or stand, to determine an azimuthal measuring direction. The apparatus can thus be used to determine geographical coordinates for the target object 11, for example.

The observation apparatus 19 which is shown in FIG. 2 and equipped with a distance measuring device according to the invention is used to ascertain a short distance 13A from the vehicle 11A as a first target object by emitting short light pulses with high measurement accuracy (symbolized by the short pulse shown from the measurement distance). The distance from the very distant building 11B as a second target object cannot be determined using the short pulse, since the SNR of the measurement signal is too low. Therefore, the long distance 13B is ascertained using a pulse of long duration (symbolized by the long pulse shown for the measurement distance). Even if the attainable measurement accuracy in this case is lower in comparison with measurement using the short pulses, it is thus at least possible to survey this distant target 11B. In several applications, less accurate measurement of distant targets is preferable to no measurement. According to the invention, the relative measurement accuracy, based on the measured distance, can be improved over the entire scope of measurement in comparison with measurement using fixed pulse duration. By way of example, the user of the observation apparatus 19 can choose between two relevant measurement modes for close or distant targets (or for high or low measurement accuracy) for this purpose during the measurement assignment.

According to the invention, short distances are measured using short pulse durations, and long distances are measured using long pulse durations. If the principle according to the invention is considered from the point of view of attainable measurement accuracy, work is performed between accurate measurement—with restricted distance range—using short pulses and less accurate measurement—with extended distance range—using long pulses.

The emission of pulses having relatively long durations is better suited to spanning long measurement distances. In comparison with a short pulse, the peak signal intensity of the long pulse is admittedly not higher, but more noise can be filtered out for a smaller bandwidth, which means that the signal to be evaluated is above the detection limit of the receiver circuit or the signal evaluation in the case of the long pulse. By contrast, the signal energy of short pulses in the case of long distances will not be sufficient to evaluate the pulse from the now more wideband and correspondingly more severe noise, as a result of which the latter can no longer be adequately detected and hence reliable distance determination is no longer possible.

Although the pulse broadening according to the invention means that a certain amount of worsening of the measurement accuracy is accepted in comparison with short pulses, it is possible to achieve a further improvement in the SNR for constant amplitude, which is of benefit particularly in the case of weak signals from long distances and hence allows the maximum range of the distance measurement to be extended.

By way of example, an EDM allows the provision of a first mode of operation for short to medium distances, in which short pulses are emitted. This first mode is distinguished by a limited range but high distance measurement accuracy.

In a second mode of operation for distant target objects, in which pulses of longer duration are emitted, the measurement accuracy is admittedly lower than in the first mode, but this mode allows the attainment of measurement ranges which may no longer be able to be measured at all in the first mode, or on account of the poor SNR can be measured with less accuracy than in the second mode. This second mode is distinguished by the greatest possible range but lower distance measurement accuracy.

Within one or both modes, it is also possible to vary the pulse amplitude, on the basis of the reflectivity of the target object and/or the measurement distance, that is to say on the basis of the intensity of the reception signal. In one embodiment according to the invention, it is therefore possible to vary not only the pulse amplitude but also the pulse width of the emitted light. In other words, the driver stage of the light source is designed in such a way that it can produce actuating pulses having a variable amplitude value and having a variable duration, these two parameters being variable during the operation of the driver stage.

The principle according to the invention can also be expanded to more than two different pulse durations, for example to a number of 3, 4, 5, 6, etc., different pulse durations as far as a quasi-continuous or continuous selection of the pulse durations. By way of example, the distance measuring device provides a plurality of appropriate modes in this case. The number of modes can therefore be extended as desired, from a selection comprising at least two modes having respective discrete pulse widths to a continuous or quasi-continuous variation of the pulse width.

In this case, the modes can be selected manually by the user, by the control electronics of the distance measuring device or automatically on the basis of the ascertained distance. By way of example, the user can use his subjective estimation of the distance to select a mode. On the basis of the result of a first distance measurement attempt, the EDM can possibly indicate to the user that characteristics of the reception signal mean that if the mode is changed then it would probably be possible to attain a better measurement result, or can advise him to perform such a mode change and a fresh measurement attempt automatically.

The circumstance described above is also evident, by way of example, in that highly accurate geodetic distance measuring devices use temporally short to very short light pulses, e.g. having modulation frequencies for the emitted signals in the range from 200 to 500 MHz or in the GHz range.

Accurate measurements of long distances often also take a considerable measurement time and/or special reflectors are needed at the target point which reflect a large proportion of the emitted signal to the measuring apparatus. In the case of geodetic surveys, this often plays a minor part, particularly because, by way of example, proper apparatus setup and insurance in a superordinate coordinate system takes up many times the duration of a measurement. Although shorter measurement times are always welcome in principle, compliance with a required measurement accuracy is paramount in areas such as land surveying.

However, there are also measurement tasks in which the speed of measurement is of greater importance. By way of example, measurement-based observation of processes in hazard areas, for example using handheld apparatuses, which are merely referenced by means of GPS with average accuracy, and the angular orientation of which is ascertained by means of an inclination sensor and/or a compass, for example. In respect of the attainable overall accuracy, which is limited anyway in this context, a distance measurement accuracy in the range of meters is often sufficient in such applications.

By way of example, the limited stability of apparatus attitude for handheld observation apparatuses having a distance measuring functionality also limits the range of distance measurement accuracy that can be considered useful. Distance measurement to millimeter accuracy makes little sense with a handheld observation apparatus, particularly for measurement distances in the range of 100 meters or a few kilometers. Magnifying observation and surveying of very distant targets is a frequency task which needs to be performed by such handheld apparatuses. In certain applications, a long measurement range, which allows observation and surveying from a relatively great distance from a hazard area, is preferable. Examples of these may be hunting assignments, military or police operations, landmark navigation for pedestrians, land, air or water vehicles, etc., for example.

One way of changing the pulse duration of the emission during measurement operation allows the construction of a new generation of EDM apparatuses in which the user has the opportunity to choose whether the aim is to perform accurate distance measurement up to moderate measurement ranges or less accurate distant measurement—but at maximum range.

Figure 3A:
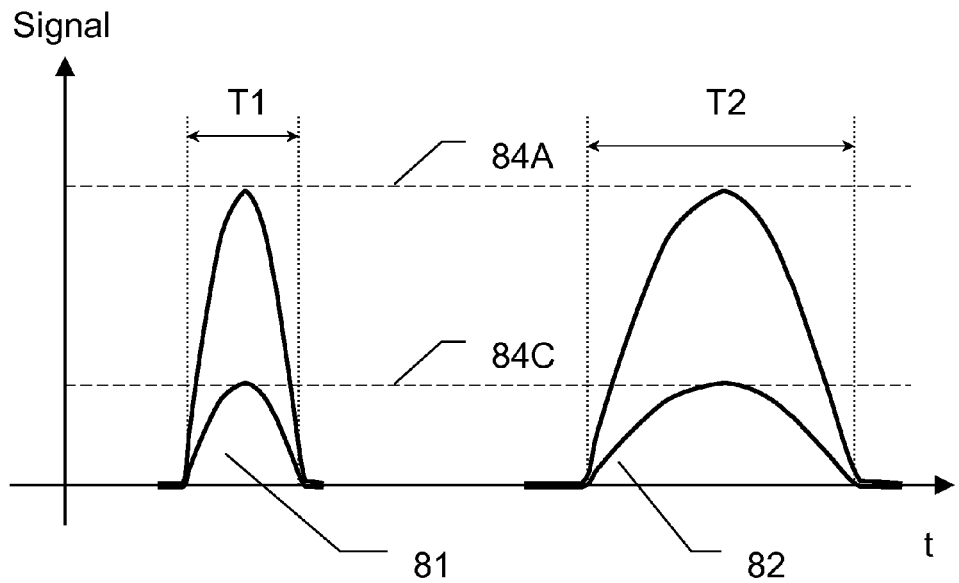
FIG. 3a shows an illustration of an exemplary first inventive embodiment of emittable optical pulses.

FIG. 3a shows an exemplary illustration of pulse shapes which can have their pulse duration set in accordance with the invention. By way of example, two levels of pulse duration—short pulses 81 of duration T1 and long pulses 82 of duration T2—are shown. In this case, purely by way of example, the pulse shape is shown to be approximately sinusoidal and may also differ from the shape shown (e.g. Gaussian pulses, asymmetric Gaussian pulses, square-wave pulses, trapezoidal-wave pulses, sinc pulses, etc.). The shape shown is the temporal intensity profile of the optical intensity of the emitted electromagnetic radiation, which is obtained from the associated profile of the electrical actuating signals from the light source 6 and the emission characteristic of the light source 6. By way of example, the pulse duration can be defined by the interval of time between the rise above and drop below a prescribed relative amplitude threshold, e.g. 50%, 10%, 90%. Alternatively, it is also possible to use the inclusion of a defined proportion of the signal energy or the area below the curve to define the pulse duration.

Figure 8:
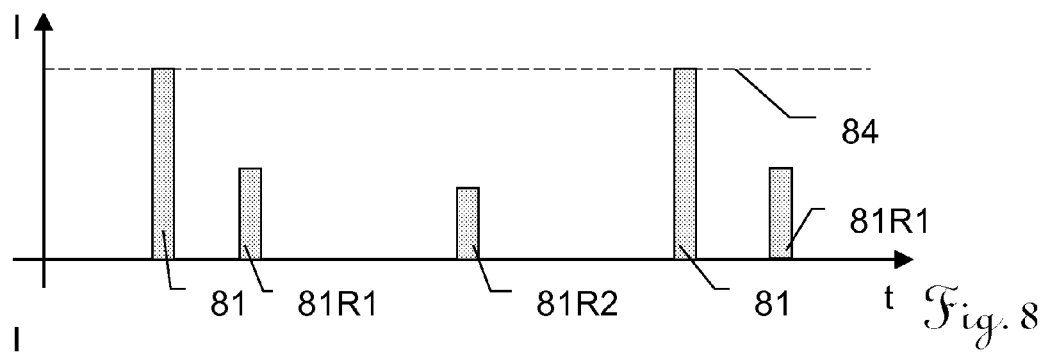
FIG. 8 shows an illustration of an exemplary first pulse train for close target objects.
Figure 9:
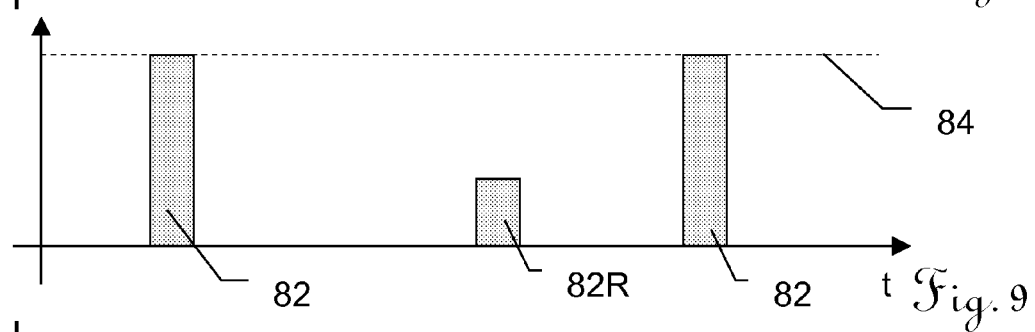
FIG. 9 shows an illustration of an exemplary second pulse train for more distant target objects.
Figure 10:
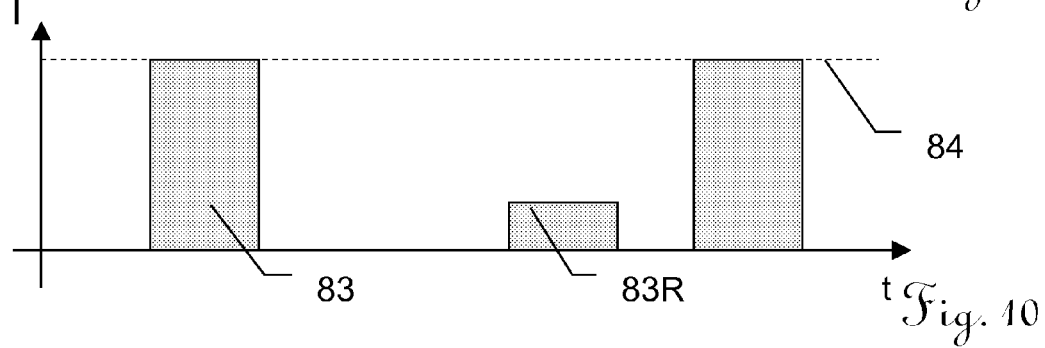
FIG. 10 shows an illustration of an exemplary third pulse train for very distant target objects.

In the graph, the short and long pulses are shown at directly successive times; in one embodiment according to the invention, however, either the short pulse duration 81 or the long pulse duration 82—depending on the active mode of operation—may have been selected and only this pulse duration can be used in each case, as shown by way of example in FIG. 8 to FIG. 10.

The figure also shows a further embodiment, in which the pulse energy is reduced. The illustration respectively shows short and long pulses having two different pulse amplitudes, in each case with the amplitude values 84A and 84C.

Figure 3B:
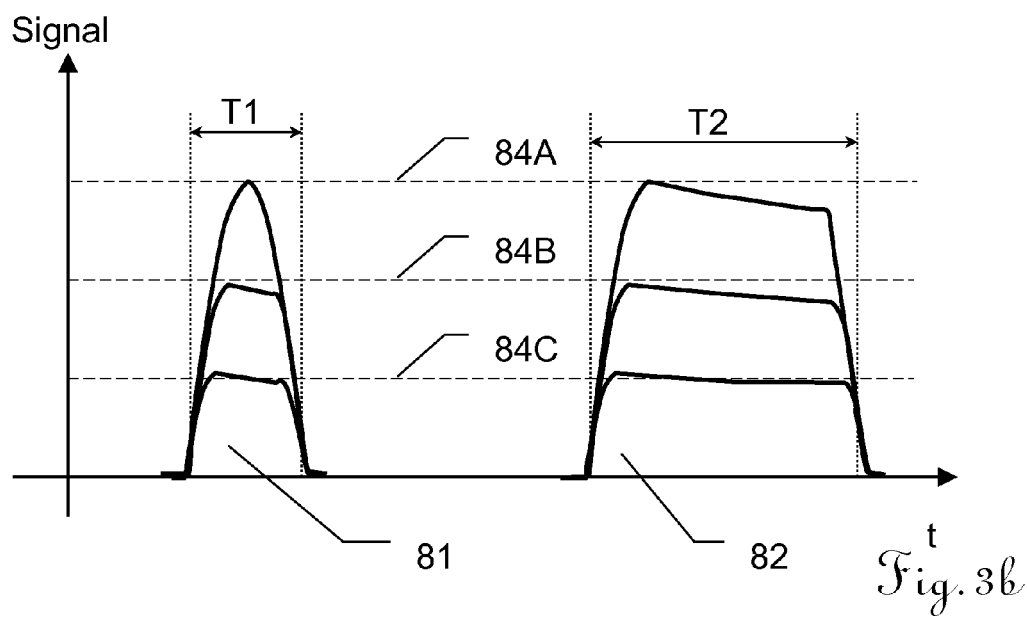
FIG. 3b shows an illustration of an exemplary second inventive embodiment of emittable optical pulses.

FIG. 3b shows an example of another pulse shape, which can be achieved by a driver circuit 5 of different design, for example, as will be explained further below. Again, short pulses 81 having a set pulse duration of T1 and long pulses 82 having a set pulse duration of T2 are shown, and in this embodiment it is also possible for the pulse amplitude to be set at three levels 84A, 84B or 84C.

Figure 4:
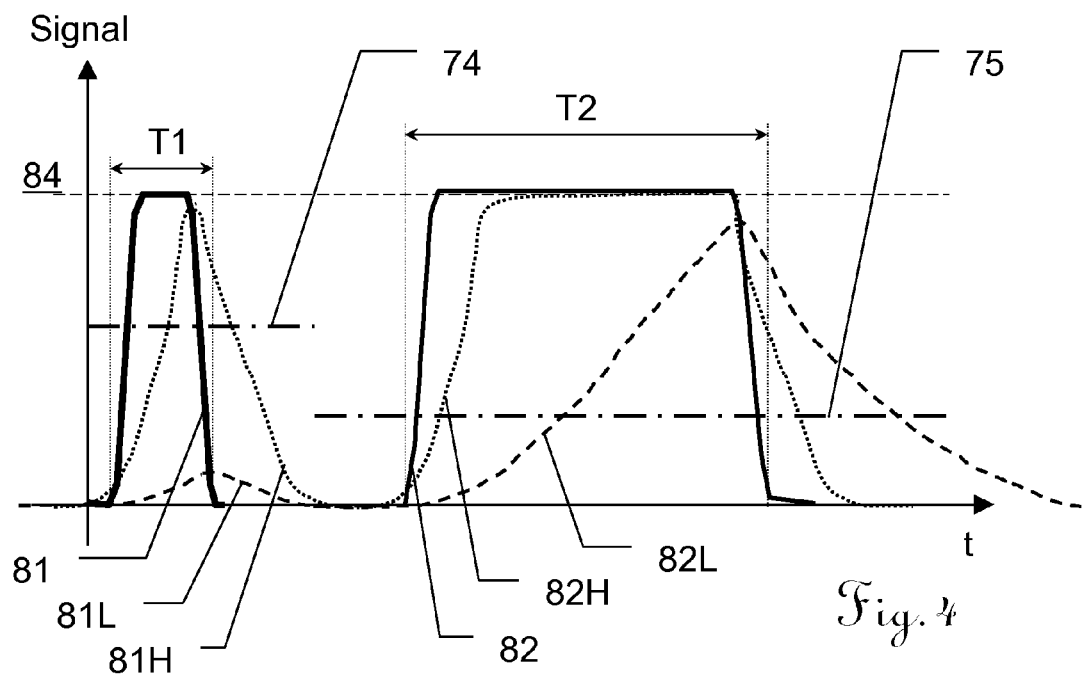
FIG. 4 shows an illustration of an exemplary third inventive embodiment of emitted optical pulses in a first and a second mode.

FIG. 4 shows emission of short and long pulses, for example having a short pulse duration T1 of approximately 100 ns and a long pulse duration T2 of approximately 400 ns. The pulse durations cited here can also be chosen differently, particularly to be shorter. The ratio of short to long pulse may also be different. The signal amplitude of the two signals 81 and 82 is in each case the same as the value 84. For the purposes of explanation, a band-limiting illustration is now shown here for both the signals in each case. The short pulse 81 with wideband filtering 81H and with narrowband filtering 81L, and the long pulse 82 with wideband filtering 82H and with narrowband filtering 82L. The noise level produced during the filtering is shown at the value 74 for the wideband filtering and the value 75 for the narrowband filtering.

When the short pulse 81 is subjected to wideband filtering, the amplitude value of the filtered signal 81H lies sufficiently above the equivalent noise level of the wideband filtering, which allows distance determination. By way of example, the wideband filtering can be determined by the specified bandwidth of the receiving circuit hardware, specifically the bandwidth of an analogue input stage. If the short pulse 81 were to be subjected to more narrowband filtering, on the other hand, the resultant signal 81L would lie below the associated noise level of the low frequency filtering 75, which would mean that no distance determination is possible.

Wideband filtering of the long pulse 82 results in the signal 82H, which does not afford any significant advantages in respect of distance evaluation over the signal 81H, but rather tends to be more disadvantageous with regard to the distance accuracy that can be attained. The resultant SNR is not substantially better on account of the peak value of approximately the same magnitude.

Although the signal strength in the case of narrowband evaluation of the signal 82 is also not better than that of signal 81H, more noise is filtered out, which results in an equivalent noise level 75. In this case, the signal-to-noise ratio has been improved with a long pulse duration T2 and narrowband filtering 82L.

Figure 5:
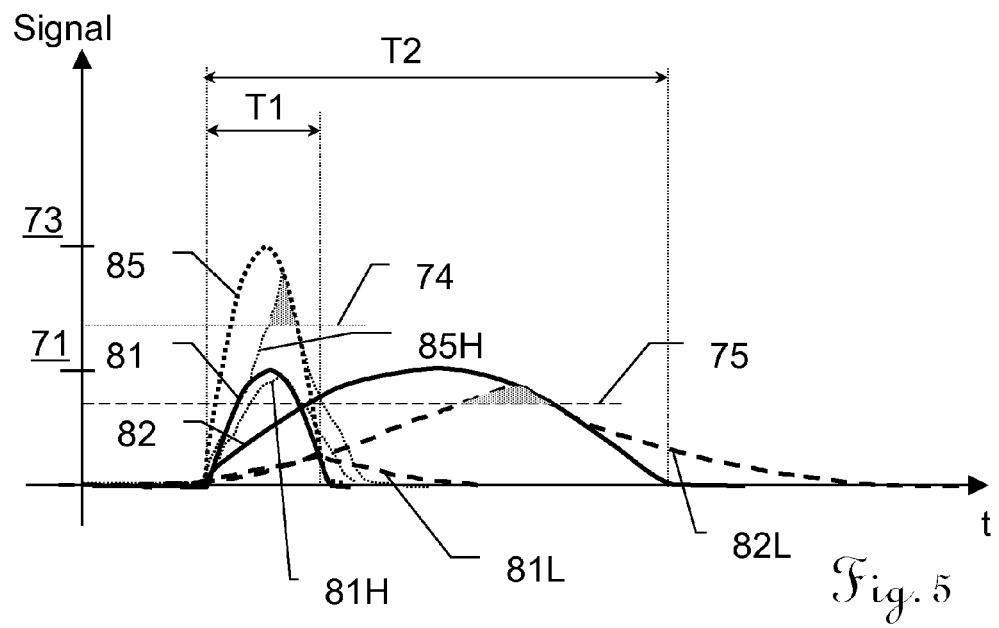
FIG. 5 shows an illustration of an exemplary fourth embodiment of an inventive setting for pulses.

FIG. 5 now shows the above principle of the range improvement according to the invention using long pulse durations with reference to an example in which measurement using short pulses would no longer be possible at all.

In the case of wideband filtering 81H, the short pulse 81 ends up below the noise level 74 produced by the filtering, which means that no distance determination is possible. A short pulse 81L that has been subjected to more narrowband filtering would even result in an even smaller signal.

If the long pulse 82 is subjected to wideband evaluation, the pulse shape is approximately maintained and the curve 82H coincides with 82, which is why it is also not shown. However, this in no way alters the fact that the signal value is below the noise value 74 associated with wideband filtering, and therefore no distance determination is possible.

Narrowband evaluation of the long pulse 82 results in the pulse shape 82L, which—viewed in absolute terms—is even disadvantageous in comparison with the wideband evaluation 82H (=82) from the point of view of amplitude. However, the filtering during the evaluation also reduces the noise level 75 picked up in the process in comparison with that of the wideband evaluation 74. Hence, it is nevertheless possible to attain an SNR of greater than 1, which is denoted by the grey area. It is comprehensible to a person skilled in the art that the condition of an SNR>1 which is cited by way of example in the explanations is merely intended to symbolize that the signal can be evaluated. In practical embodiments, it is entirely possible for a higher or lower SNR value to be important as a limit for the determinability of the distance, for example when additional further methods (e.g. statistical averaging operations, signal accumulation, correlation reception, etc.) are used to improve the SNR.

In order to achieve an approximately equivalent SNR for the short pulse 81 and wideband evaluation, the pulse amplitude in the example shown would need to be raised for approximately double, as shown by the curves 85 and 85H. There is no question of the more wideband evaluation possibly allowing higher distance measurement accuracy to be attained in this case, but an arbitrary increase in the emission power cannot always be implemented in practice for a wide variety of reasons (several of which are mentioned).

In line with the above analysis, the distance range can be improved, in accordance with the invention, for only weakly returning signals which therefore have a low SNR. As a simplified numerical example, the invention can, to this end, use quadrupling of the pulse duration and corresponding reduction of the bandwidth in the evaluation, for example, to reduce the noise by $N=\sqrt{(BW)}$—that is to say $N=\sqrt{(¼)}=½$—, or in other words the SNR can be improved by a factor of 2. As a result, it is also possible for the EDM to ascertain these long distances, which in the case of short pulses would fall beneath the measurability threshold of the SNR.

This (simplified) example therefore shows that a distance for which the returning signal has only the level 71, for example on account of the long measurement distance, can be measured using a long pulse 82, whereas a short pulse would not lead to a measurement result. The maximum measurement distance or distance range of the EDM has therefore been improved in accordance with the invention.

Figure 6:
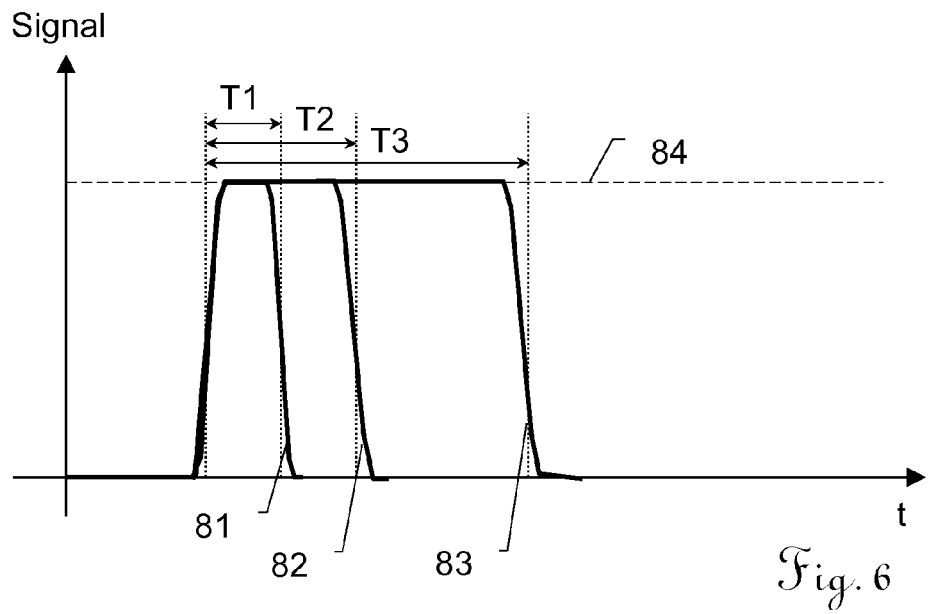
FIG. 6 shows an illustration of an exemplary first embodiment of a setting for different measurement distances.

FIG. 6 shows a further embodiment of inventive modification of the light pulses in which transmission pulses overlaid with three different pulse lengths—with a common emission time—are shown. According to the invention, this involves the use of the short pulses 81 (T1) for close target objects, the medium pulse durations 82 (T2) for medium ranges and the long pulse durations 83 (T3) for very distant target objects, with a greater maximum measurement distance being able to be captured toward longer pulses. The three-level gradation of the pulse durations T1, T2 and T3 can be regarded as purely exemplary in this case and, in specific embodiments, may be produced by two-level through to (quasi-)continuous adjustability of the pulse duration.

Figure 7:
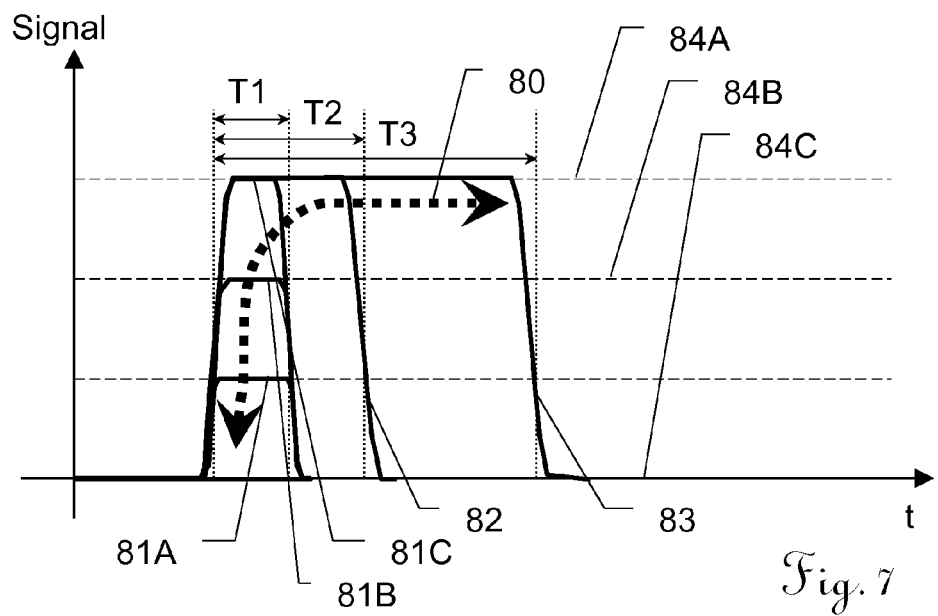
FIG. 7 shows an illustration of an exemplary second embodiment of a setting for different measurement distances.

FIG. 7 shows an embodiment in which a possible setting for a driver stage over the distance measurement range is shown. In this case, long pulses 83 are used for long distances, and although said long pulses have the lowest distance accuracy of the low bandwidth in the evaluation from all the modes, they have the highest SNR.

If the SNR is sufficient anyway for relatively short distances, for example, then the pulse duration T2 is set and the bandwidth for the evaluation increased—which improves the achievable measurement accuracy. A resultant decrease in the SNR—which at most also entails a decrease in the maximum measurable range—can be accepted in this case on account of the sufficient reception signals.

For even shorter distances, it is similarly possible to use the pulse 81C with a pulse duration of T1. In this case, it is possible to use the full bandwidth of the receiver electronics used, for example, in order to be able to ascertain the most accurate distance information possible. The received signal is of sufficient strength to obtain a sufficient SNR even with the resultant increased noise bandwidth.

If the reception signal becomes too strong, for example on account of highly reflective and/or very close target objects, it is possible to reduce the amplitude of the transmission pulse to that of 81B or 81A in order to avoid saturating the receiving circuit—which would likewise make accurate measurement difficult or impossible. Under particular measurement circumstances, such reduction of the amplitude can also be used for long pulses. An example which may be cited in this regard is the case of multiple target measurement, for example distance determination for a distant target through vegetation or a pane of glass.

The double-headed arrow 80 symbolizes the alteration—used in this specific embodiment—of the setting for the driver stage using the measurement distance. The adjustment along this arrow can be performed fully automatically using the recorded measured values. The strategy used for this (e.g. arrow direction for the process when distance is unknown) can be matched to the apparatus-specific measurement tasks. In other embodiments, this can also be accomplished semiautomatically, for example by virtue of the user choosing between short or long range (that is to say the pulse duration) and the evaluation unit automatically matching the amplitude of the emitted signal within this selection. If appropriate, the user may be asked to change the mode if this appears advantageous to the evaluation unit on the basis of the received signals.

FIG. 8 illustrates continuous emission of single pulses 81 of short duration in a first mode of operation with relatively short maximum range but good distance measurement accuracy. The pulse shape shown in this and the subsequent figures is square to simplify matters, but this should not be regarded as restrictive. The signal component 81R1 reflected from the target object follows the transmission pulse at a short interval of time and has a relatively high intensity or signal strength. On account of the high signal strength, the received signal 81R1 can be evaluated using a high bandwidth and hence with correspondingly high accuracy over time, which allows accurate distance determination. The large noise bandwidth which the evaluated signal likewise contains is not detrimental in this case, since, as stated, the useful signal is sufficiently large and hence the SNR meets the requirements for distance determination.

FIG. 9 now illustrates a pulse duration which is increased in accordance with the invention, the amplitude value 84 being the same as in FIG. 5. Since the measurement distance is now greater, the interval of time between the transmission pulse 82 and the reception pulse 82R is correspondingly longer and also the amplitude of the received pulse 82R is smaller for constant transmission pulse amplitude. As explained, by broadening the pulses and appropriately matching the bandwidth for the signal evaluation, it is nevertheless possible to achieve an adequate SNR—or in other words a longer maximum measurement distance. The pulses from FIG. 9 can thus advantageously be used for long measurement distances which can be measured only poorly or not at all using the pulses from FIG. 8. Although the measurement accuracy that can be achieved with the long pulses from FIG. 9 is lower than that with the short pulses from FIG. 8, the long pulses allow greater ranges to be attained. As already explained, the short pulses are advantageous for increased accuracy of the measured distance, on the other hand, but with a more restricted range scope in comparison with the pulses from FIG. 6.

FIG. 10 shows a further embodiment of yet longer pulses 83. In this case too, the pulse amplitude 84, that is to say the intensity of the emitted signal, is the same as in FIG. 8 and FIG. 9. As mentioned, in one embodiment, the amplitude value of the pulses may alternatively be adjustable. The pulse duration that is set even longer in this embodiment allows even greater maximum distances to be achieved than in FIG. 9. According to the invention, at least two pulse durations are implemented, one for accurate measurement of close target and one for less accurate measurement of more distant targets. However, three or more levels (for close, medium-range and distant targets) and also continuous or quasi-continuous (=high-resolution discrete levels) setting options for the pulse durations are also embodiments according to the invention.

The electronic implementation of an EDM which, according to the invention, uses different pulse durations can be provided by the driver stage 5 using a wide variety of circuitry approaches. Some exemplary instances of these are explained with reference to the figures which follow. The embodiments shown here are not intended to be considered to be a conclusive list. Only basic circuits for providing the functionality according to the invention are shown. Practical circuitry implementations of the embodiments shown can be extended if appropriate in line with general basic knowledge of electronic circuit design. A person skilled in the art who is familiar with the field of electrical engineering is able to deduce the relevant mathematical representations of the circuit characteristics or to ascertain them by means of numerical simulations in order to dimension component values such that a result according to the invention is attained in the practical implementation. By way of example, in the circuits represented here, temperature compensation circuits or other circuits for lessening error influences, energy storage capacitors, settings for operating points for components, etc. are not shown for the sake of clarity.

The additionally required circuit complexity in this case keeps within limits in comparison with the prior art design. Specifically in comparison with the costs of the other components in an EDM (specifically the laser), this is more or less invisible. A nonsilicon laser, such as a 1550 nm laser of appropriate power, constitutes many times the costs of a driver circuit extended in accordance with the invention. Use of a more powerful laser to extend the measurement range would mean more complexity in comparison with the present invention.

Figure 11:
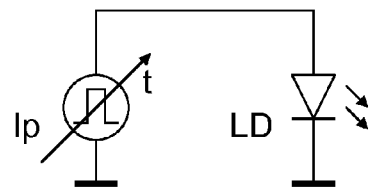
FIG. 11 shows an exemplary schematic illustration of a first circuitry embodiment of an inventive driver stage.

FIG. 11 shows an exemplary general equivalent circuit diagram for an inventive driver stage for the inventive emission of pulses having an adjustable pulse duration in the form of a current pulse output stage Ip with variable pulse duration t.

Figure 12:
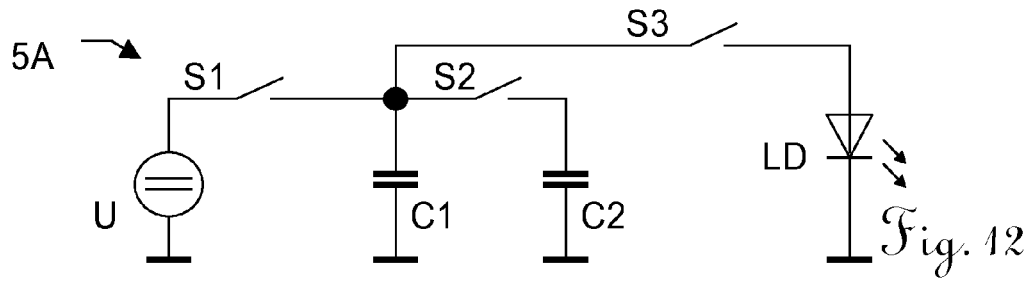
FIG. 12 shows an exemplary schematic illustration of a second circuitry embodiment of an inventive driver stage.

FIG. 12 shows an exemplary circuit diagram for an embodiment of an inventive driver stage 5A for generating actuating pulses with, particularly during the operation thereof, adjustable pulse amplitude and adjustable pulse duration which can be used to actuate a light source LD in an EDM. The light source LD shown in this case is a laser diode, with it also being possible to use other light sources, such as light-emitting diodes, etc. The light source may also be a pump light source for a laser. The driver stage 5A draws its power in this illustration from the voltage source U, which may be embodied directly as a voltage source in the form of a battery or a storage battery, but may also have further electronic circuit components, such as energy storage capacitors, boost or buck converters, voltage stabilizers, etc. In this case, the switch S1 can be used to charge the capacitor C1 from the voltage source, and the switch S3 can be used to discharge the capacitor C1 via the light source LD with the emission of a light pulse. Once the switch S2 is closed, the capacitor C2 is connected in parallel to C1, and the thus higher total capacitance when the switch S3 is closed means that a light pulse of a relatively long duration is emitted.

Figure 13:
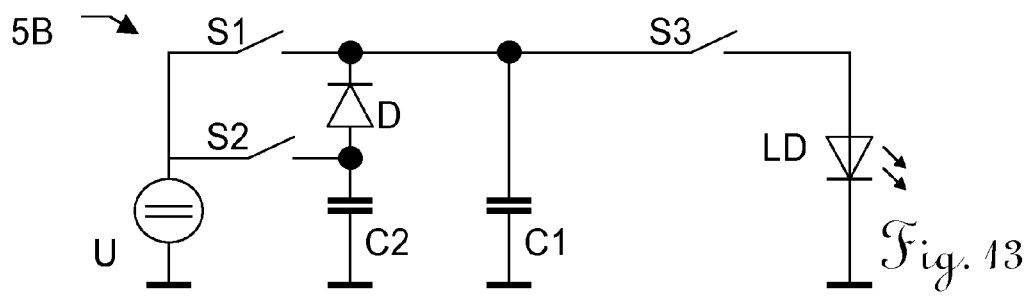
FIG. 13 shows an exemplary schematic illustration of a third circuitry embodiment of an inventive driver stage.

FIG. 13 shows an exemplary circuit diagram for an embodiment of an inventive driver stage 5B in an EDM transmitting unit. In this case, an alternative circuitry solution for connection of an additional capacitance to extend the pulse duration is represented by the switch S2.

A transmitting unit according to the invention having a pulse output stage according to the invention, which allows control of the amplitude values and of the pulse duration of the pulses, allows the described trade-off between measurement accuracy and measurement range by the user during or before the measurement in the field. In accordance with the present invention, either emission of short light pulse durations with relatively high distance measurement accuracy is made possible or else emission with long light pulse durations with a greater range for the distance measurement is provided, and it is possible to change between these even during the measurement mode.

As described, a pulse output stage embodied according to the invention (or an inventive distance measuring device having such a pulse output stage, or an apparatus having such a distance measuring device), in which at least two pulse durations can be set in the field during or before a respective measurement, for example, allows selection between "high accuracy of the measurements up to medium ranges" or "average accuracies for greatest possible measurement distance".

It is therefore possible to combine two worlds in one apparatus design, and no compromise is needed to be made in this regard during the design phase of the apparatus. At most, the EDM can also automatically itself vary the emission pulse duration using the reflected signals (e.g. using the intensity thereof or a first, coarse distance determination or estimation).

Figure 14:
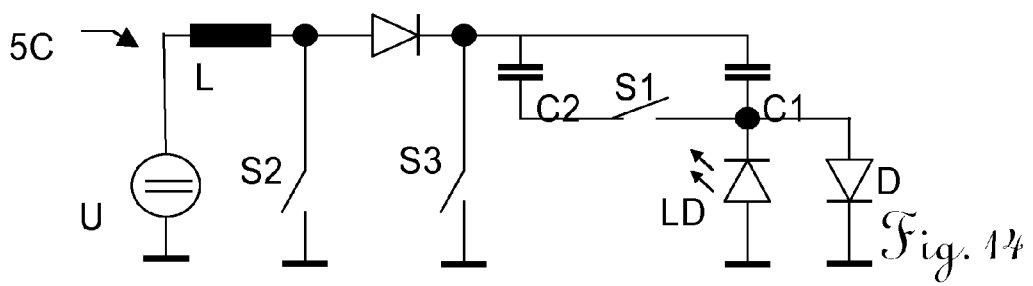
FIG. 14 shows an exemplary schematic illustration of a fourth circuitry embodiment of an inventive driver stage.

FIG. 14 shows an exemplary circuit diagram for an embodiment of an inventive driver stage 5C. In this case, the circuit portion in the case of the voltage source forms a type of boost converter. The variation in the pulse duration is in turn produced by connecting a further capacitor C2 using the switch S1.

Figure 15:
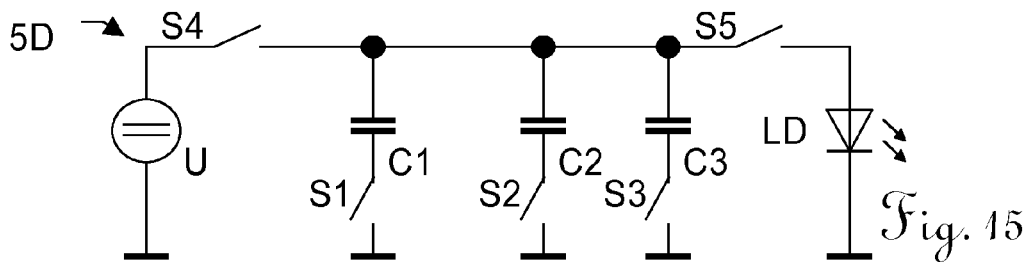
FIG. 15 shows an exemplary schematic illustration of a fifth circuitry embodiment of an inventive driver stage.

FIG. 15 shows an exemplary circuit diagram for a further embodiment of an inventive driver stage 5D, in the case of which different combinations of the three switches S1, S2, S3 allow different transmission pulses to be selected.

Figure 16:
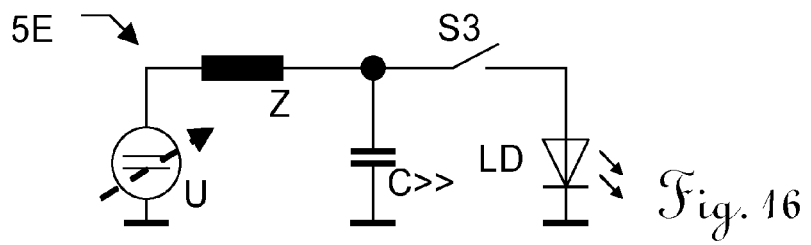
FIG. 16 shows an exemplary schematic illustration of a sixth circuitry embodiment of an inventive driver stage.

FIG. 16 shows an exemplary circuit diagram for a further embodiment of an inventive driver stage 5E, in the case of which an incomplete discharge for a capacitor C>> takes place, which has a higher capacitance value in comparison with the previous embodiments. The switched-on time for S3 is used to determine the pulse duration, with the capacitor C>> not being discharged completely, but rather keeping its voltage essentially constant during the pulse emission.

In this case, the resultant pulse shape corresponds approximately to that from FIG. 3b. Optionally, the amplitude may be able to be adjusted by varying the voltage U (indicated by the dashed arrow).

In the circuits 5A, 5B, 5C, 5D, 5E shown, two or more different pulse lengths can be set. If required, it is also possible for the pulse amplitude to be designed to be adjustable, e.g. by virtue of appropriate switch actuation or variation of the supply voltage. By way of example, an adjustable actuating voltage can be used to set the pulse amplitude and, independently thereof, by means of a switched-on time for the switch, the pulse width. The power transistors used for switching the often considerable actuating currents in the driver circuits may in this case be not only classical silicon power drivers, such as bipolar or field effect transistors, but also gallium arsenide or gallium nitride transistors, for example.

What is claimed is:
1. An opto-electronic distance measuring device, comprising:
   a transmitting unit having a driver stage for a light source for emitting optical pulses as pulsed-mode-intensity-modulated optical radiation,
   a receiving unit for receiving a portion of the optical radiation, said portion being reflected from a target object, and converting it into an electrical reception signal, by means of a photosensitive electrical component,
   an analogue-digital converter for digitizing the reception signal, and an electronic evaluation unit which is configured such that a distance from the target object can be ascertained on the basis of a signal propagation time using the digitized reception signal, wherein the electronic evaluation unit is configured such that the setting of the pulse duration is taken as a basis for using configurable filter to set a bandwidth for the reception signal, wherein the driver stage is configured such that at least two pulse durations of different length for the optical pulses can be set, and wherein extension of the pulse duration allows expansion of a distance measurement range, as a maximum ascertainable distance, to be achieved.

2. The distance measuring device according to claim 1, wherein the distance measuring device provides a first mode of operation having a first pulse duration and at least one second mode of operation having a second pulse duration, wherein the first pulse duration is shorter than the second, wherein one of the modes of operation can be selected by a user.

3. The distance measuring device according to claim 1, wherein the transmitting unit is configured such that the pulse duration is set on the basis of an at least coarsely ascertained or estimated distance from the target object, wherein the distance measuring device is configured such that the pulse duration is set to be longer for long distances than for short distances.

4. The distance measuring device according to claim 1, wherein the driver stage is a pulse output stage which is configured such that the pulse duration can be set variably independently of a pulse amplitude of the optical pulses.

5. The distance measuring device according to claim 1, wherein the driver stage has a connectable capacitor for storing a pulse energy, wherein by connecting the capacitor the pulse duration can be set.

6. An observation apparatus having a distance measuring device according to claim 1, the apparatus comprising: a targeting device for sighting the target object, wherein an optical axis of the targeting device points in the same direction as an optical axis of the distance measuring device, wherein the observation apparatus is configured such that a first mode distance accuracy or a second mode measurement distance of the distance measuring device can be selected using respective different pulse durations.

7. The observation apparatus according to claim 6, which has an automatic mode which is configured such that the variable setting of the pulse duration takes place automatically in accordance with an evaluatability of reception pulses in the reception signal and a signal-to-noise ratio that can be achieved therefor.

8. A distance measuring method comprising:
reception of a portion of the optical radiation, said portion being reflected from a target object, by means of a photosensitive electrical component which converts the received optical radiation into an electrical reception signal,
digitization of the reception signal by means of an analogue-digital converter, and
ascertainment of a distance from the target object on the basis of a signal propagation time by means of evaluation of the digitized reception signal by means of an electronic evaluation unit, wherein the electronic evaluation unit is configured such that the setting of the pulse duration is taken as a basis for using configurable filter to set a bandwidth for the reception signal, emission of pulsed-mode-amplitude-modulated optical radiation, wherein one of at least two adjustable pulse durations of different length for the optical radiation is selected, which allows a maximum value for the ascertainable distance to be altered, wherein extension of the pulse duration increases the maximum value for the ascertainable distance.

9. The distance measuring method according to claim 8, wherein the distance is ascertained by means of configurable filtering of the reception signal, which filtering is configured in accordance with the set pulse duration such that a bandwidth for the reception signal is matched to the set pulse duration.

10. The distance measuring method according to claim 9, wherein besides the pulse duration being set the pulse amplitude is also set, wherein the pulse duration and the pulse amplitude can each be set independently of one another.

11. The distance measuring method according to claim 8, wherein the pulse duration is set on the basis of the distance, wherein a longer pulse duration is set for a distant target object at a relatively long distance than for a close target object at a shorter distance.

12. The distance measuring method according to claim 8, wherein a selection is made between a first mode accurate measurement with emission of the optical pulses with a shorter pulse duration than in at least one second mode long measurement with emission of the optical pulses with a longer pulse duration than in the first mode.

13. The method of claim 8, comprising:
matching of a pulse duration of an emitted optical transmission signal from the distance measuring device on the basis of an ascertained or ascertainable distance, comprising matching of a bandwidth of a reception signal, which is used for ascertaining the distance, to the pulse duration.

14. A computer program product having program code, which is stored on a non-transitory machine-readable storage medium, embodied by an electromagnetic wave, for carrying out the method according to claim 8, wherein the program code varies a maximum measurement distance of the optoelectronic distance measuring method by setting a pulse duration for optical radiation emitted in pulsed fashion, when the program code is executed in an evaluation unit of an optoelectronic distance measuring device.

15. The distance measuring device according to claim 1, wherein extension of the pulse duration involves reduction of the bandwidth, and wherein extension of the pulse duration involves lowering of an upper cutoff frequency for a low-pass-filter characteristic of the configurable filter.

16. The distance measuring device according to claim 1, wherein the configurable filter is a digital configurable filter to set the bandwidth for a digitized reception signal.

17. The distance measuring device according to claim 5, wherein
a distance threshold being exceeded by the ascertained distance automatically involves extension of the pulse duration in comparison with that for a distance below the distance threshold.

18. The distance measuring method according to claim 12, wherein
the bandwidth is decreased towards longer pulse durations.

19. The distance measuring method according to claim 15, wherein
the set pulse duration is automatically matched to the ascertained distance, wherein the pulse duration is extended as distance increases.

* * * * *